Oct. 15, 1968    R. E. KOSTUR    3,405,506
PROTECTIVE DEVICE FOR THE LEG OF A HORSE
Filed Sept. 3, 1966    2 Sheets-Sheet 1

INVENTOR:
ROBERT E. KOSTUR
BY:
Fidler, Bradley & Patnaude
ATTORNEYS

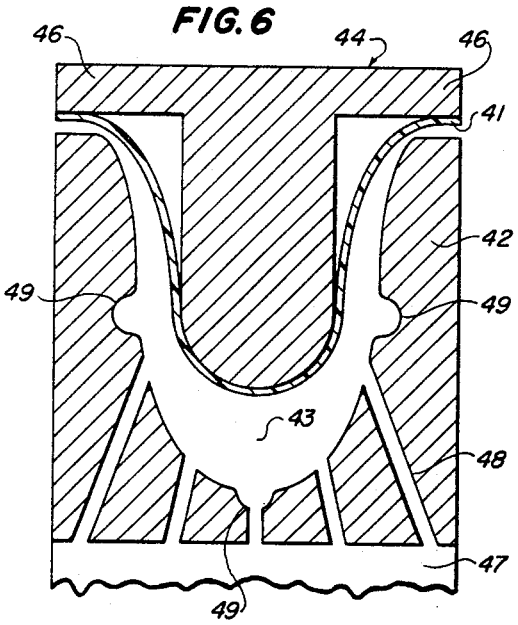
FIG. 6
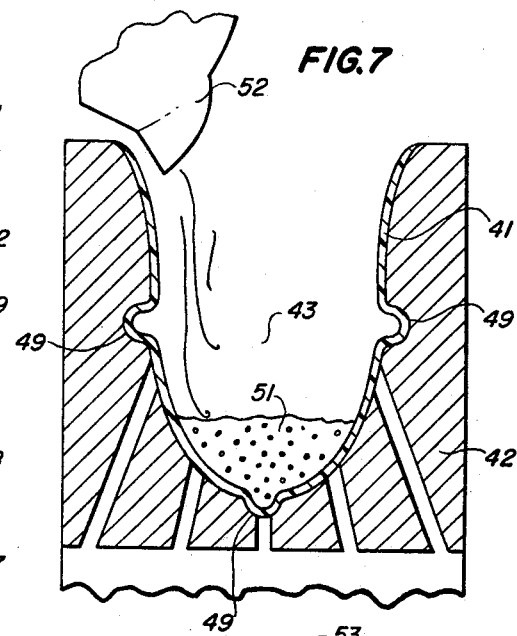
FIG. 7
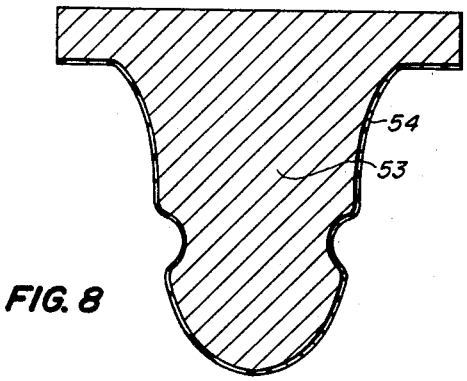
FIG. 8
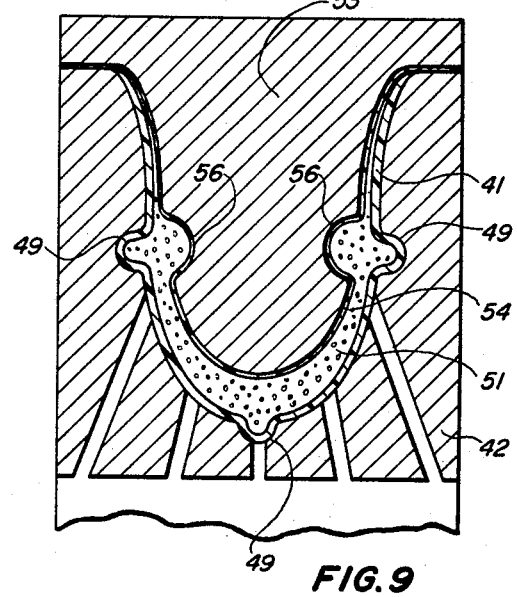
FIG. 9
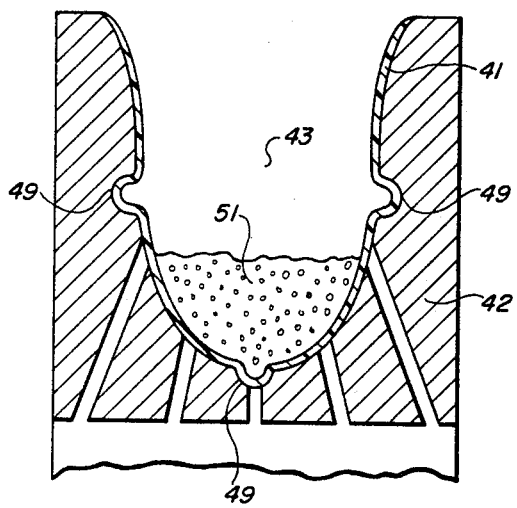
INVENTOR
ROBERT E. KOSTUR
BY:
ATTORNEYS

United States Patent Office 3,405,506
Patented Oct. 15, 1968

3,405,506
PROTECTIVE DEVICE FOR THE LEG
OF A HORSE
Robert E. Kostur, 11 Brighten Lane,
Oak Brook, Ill. 60521
Filed Sept. 8, 1966, Ser. No. 577,853
5 Claims. (Cl. 54—82)

The present invention relates to a protective device for the leg of a horse, and it relates more particularly to a guard attachable to the leg of a horse for protecting the tendon thereof against externally-applied impacts and to the method for making the same.

Various types of protective devices have been employed for the protection of a horse's leg against externally-applied impacts. Such impacts often occur during the course of a sporting event such as polo by a polo ball or polo mallet, or during the course of transportation of the animal in a vehicle whereby the animal may injure itself by accidentally kicking its leg. In the past, the legs of the horse were bound with cloth bandages between the knee and fetlock to provide the required protection, which protection is especially important for the tendon that extends along the rear portion of the horse's leg parallel to the cannon bone of the leg. It was found necessary, however, to have the bandages secured in a proper fashion by a skilled person, or else a loosely-wound bandage could unwind and cause the horse to trip and fall, or a tightly-wound bandage would tend to cause injury to the horse's leg. Also, the bandages must be redyed after cleaning as the dye would tend to come off of the bandages and onto the leg of the horse due to perspiration and the nature of the material of the cloth bandages.

In an attempt to overcome these difficulties, several devices have been employed such as leather boots lined with felt or sponge rubber and wrapped about the horse's leg. These arrangements, however, were not entirely satisfactory in that the leather would tend to crack and stiffen after repeated use thereof and the lining would separate from the leather due to perspiration and repeated washing of the boot. The leather construction was relatively heavy and burdonsome to the horse as the large leather boot would not remain firmly in position and tended to move about, thereby impeding the free movement of the horse. Furthermore, the heavy leather construction having a sponge rubber or felt lining prevented ventilation which caused added perspiration and irritation of the animal's leg, and thereby caused the leather boot to become unsanitary.

It is therefore a principal object of the present invention to provide an improved device for protecting the leg of a horse from externally-applied impacts, which device has a lightweight construction with a relatively simple design, is easily and efficiently attached to the horse's leg by an amateur, is easily cleaned and provides ventilation to help maintain the protective device in a sanitary condition.

Another object of the present invention is to provide a protective device for a horse's leg having the foregoing qualities and providing a strong, durable surface to absorb and distribute externally-applied shocks, while yielding to upwardly-directed forces at the bottom portion of the protective device so that the entire protective device can move upwardly when the hoof of the animal sinks into mud or soft ground.

Still another object of the present invention is to provide a protective device having the foregoing qualities which is readily adapted to fit substantially any given horse without the use of major alterations or modifications thereof.

Yet another object of the present invention is to provide an effective and efficient method of making a protective device having the foregoing qualities.

Briefly, the above and further objects are realized in accordance with the present invention by providing a protective device comprising a durable, elongated and substantially U-shaped member molded of plastic and having a plurality of longitudinal spaced-apart ribs integrally molded thereon for absorbing and uniformly distributing external impacts, having a resilient and flexible backing material secured to the inner surface of the U-shaped member to form a compressible inner lining therefor, and having one or more elastic bands attached to the U-shaped member for detachably holding the U-shaped member to the sides and rear portions of the leg of a horse in such a manner that the inner lining conforms to the contour of the leg of the horse between the knee and fetlock, thereby providing protection for the tendon at the rear portion of the horse's leg. The entire unit has a series of apertures therein for ventilation purposes, and has a permanent color which enables the protective device to undergo repeated washings without causing the color to fade or run.

These, and other objects, features, and advantages of the present invention will become readily apparent from a careful consideration of the following detailed description, when considered in conjunction with the accompanying drawings, wherein like reference numerals and characters refer to like and corresponding parts throughout the several views and wherein:

FIGURES 6–9 illustrate a series of steps of a method for making the protective device of FIG. 1 in accordance with another aspect of the present invention.

Figure 1:
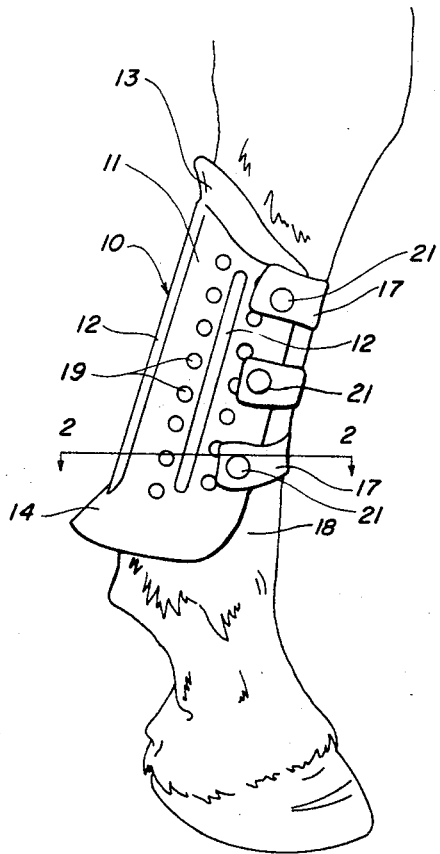
FIGURE 1 is a view in perspective of a protective device in accordance with the principles of the present invention, which device is shown in a mounted position at the sides and rear portions of a leg of a horse between the knee and hoof portion thereof.

Referring now to the drawings and particularly to FIG. 1 thereof, there is shown a protective device generally indicated by the reference numeral 10 which comprises a unitary molded-plastic boot or shell 11. A series of parallel spaced-apart laterally disposed ribs 12 are integrally formed thereon to absorb and uniformly distribute external impacts. In order to prevent injury to the horse's leg if the protective device should move upwardly or downwardly, upper and lower outwardly extending flange portions 13 and 14 are provided which have smoothly curved surfaces. A compressible inner lining is provided by a resilient backing member 16, best shown in FIG. 2, which is bonded to the inner surface of the molded-plastic member 11. This compressible inner lining closely conforms to the external contour of the horse's leg to provide a tight fit, and help absorb external impacts. Attaching means, such as a plurality of elastic bands or straps 17, are provided for detachably securing the plastic shell member 11 to the rear portion of a horse's leg 18 between the knee and fetlock thereof. In accordance with the invention, either two or three straps may be provided, or else a single wide band (not shown) may be provided in place of the plurality of narrow straps as shown in FIG. 1.

In order to provide the necessary rigidity and strength, the plastic member 11 has a thickness between 0.030 and 0.040 inch and is preferably composed of a high impact thermoplastic resin such as acunitrol butadiene styrene. The shell 11 can also be formed of a flexible thermoplastic material when it is to be used for the protection of jumpers. For appearance purposes, the outer surface of the plastic member 11 may have any desired finish such, for example, as a pebble or a simulated leather finish.

For the purpose of ventilating the portion of the horse's leg which is beneath the boot 11, a plurality of parallel, laterally-disposed rows of apertures are provided. Each of the apertures 19 extends entirely through the plastic member 11 and the resilient backing member 16 to provide a passage from the outside environment to the surface of the horse's leg.

The upper flange portion 13 is provided with a smoothly curved, outwardly-extending surface for protecting the back and sides of the leg 18 near the knee. This flange portion 13 provides protection from externally-applied shocks, such as a force produced by a swiftly moving polo mallet or polo ball which would be deflected by means of the flange portion 13. The lower flange portion 14 has a smooth, downwardly-curved surface which overlies the ankle and protects the lower portion of the leg 18 from externally-applied shocks. Each of these upper and lower flange portions may be trimmed by a suitable cutting device such as scissors to fit the protective device 10 to a particular horse and thereby provide a snug and uniform fit.

Each elastic band 17 is detachably secured to the plastic member 11 by means of a pair of suitable metallic fastening devices 21 respectively secured to each end of the bands 17. Each fastening device may be a conventional two-piece snap, whereby a male fastening member is secured to the plastic member 11 and a female fastening member is secured to the elastic band 17. Consequently, an amateur can easily and efficiently mount the protective device 10 onto the horse's leg by merely placing the plastic member 11 into position so that the inner surface thereof contacts the sides and rear portions of the leg, thence tightly stretching the elastic bands 17 about the front portion of the leg and finally closing the fastening device 21 into its closed position.

The elastic bands 17 enable the protective device 10 to resiliently yield to upwardly directed forces acting against the lower flange portion 14, thereby causing the elastic bands to streach to enable the protective device 10 to move upwardly without causing injury to the horse's leg. However, externally-applied shocks directed against the lateral surfaces of the protective device 10 are absorbed by the stiffening ribs 12 and distributed over the surface of the plastic member 11 to cushion the impact for preventing injury to the animal.

Figure 2:
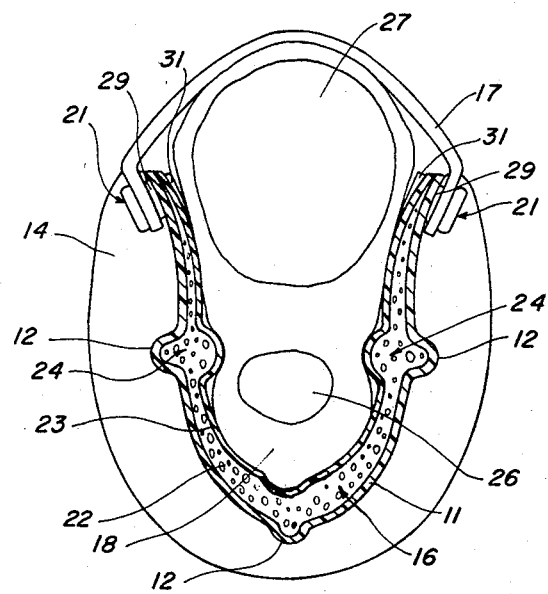
FIGURE 2 is an enlarged cross-sectional view of the protective device of FIG. 1 taken substantially along the line 2—2 thereof.

Referring now to FIG. 2, the resilient backing member 16 comprises a resilient and flexible foam-like member 22 secured to the inner curved surface of the plastic member 11 and a soft pliable film 23 secured to the foam-like member 22. The foam member 22 provides a compressible inner lining for the protective device 10 to absorb externally-applied forces, and also to closely conform to the contour of the horse's leg to provide a snug fit therefor. The smooth imperforate film 23 enables the inner surface of the protective device 10 to be easily and efficiently cleaned by merely washing the same and also tends to prevent the foam member 22 from absorbing perspiration.

The backing member 16 has a relatively greater cross-sectional area at the sides of the molded member opposite to the ribs 12 formed along the side walls of the plastic member 11. These built-up areas, generally indicated at 24, contact the surface of each side of the leg 18 between the tendon 26 and the cannon bone 27 of the leg 18. The resilient backing member 16 also has a relatively larger cross-sectional area at the rear portion of the molded member 11 to provide greater protection for the tendon 26, and to prevent bowing thereof by providing support.

As illustrated in FIG. 2, the fastening device 21 comprises a female fastening member 29, having a generally T-shaped outer surface in cross section, fixedly secured to one end of the elastic band 17 and a male fastening member 31 rigidly secured to the plastic member 11 near a terminal edge thereof for complementally and detachably engaging the female member 29.

Figures 3, 4:
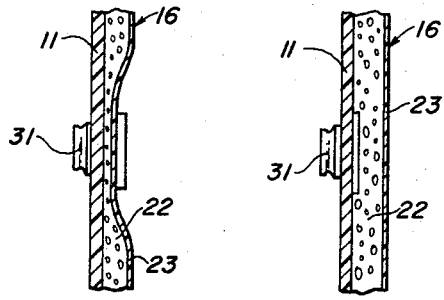
FIGURE 3 is an enlarged side-elevational view of a portion of the device of FIGS. 1 and 2, illustrating a mounting arrangement for a male portion of a metallic snap fastening device, with the female portion thereof removed.
FIGURE 4 is an enlarged side-elevational view of a modified mounting arrangement for the male portion of the snap fastening device.

Referring now to FIG. 3, the male fastening member 31 of the fastening device 21 is shown in greater detail. The male member 31 is secured to the plastic member 11 by inserting the male member 31 through an aperture which extends through the plastic member 11, the foam-like material 22 and the film 23. As a final step in the process of manufacturing the protective device 10, the male member 31 can be inserted into its final position after the backing member 16 is affixed to the plastic member 11.

Referring now to FIG. 4, another technique for installing the male fastening member 31 into position is illustrated. The male fastening member 31 may be secured to the wall of the plastic member 11 before the backing member 16 is secured thereto. Consequently, the foam-like member 22 covers the inner surface of the male fastening member 21, thereby preventing the fastening member 31 from contacting the surface of the leg of the horse. Furthermore, the plastic member 11 may be provided with a molded embossment to surround the fastening member 31 on the outside thereof (not shown in the drawings) in either the arrangement of FIG. 3 or the arrangement of FIG. 4.

Figure 5:
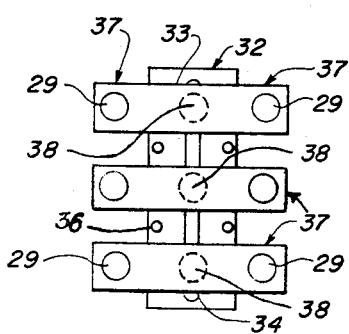
FIGURE 5 is a front elevational view of a front guard for the front portion of the leg of a horse, which device is attachable to the protective device of FIG 1.

Referring now to FIG. 5, there is shown a molded-plastic front guard 32 which protects the front portion of the horse's leg 18. The front guard 32 comprises a molded-plastic shell member 33 having a laterally-disposed stiffening rib 34 for absorbing and uniformly distributing externally-applied forces. Ventilation is provided by longitudinal rows of apertures 36. A plurality of elastic bands 37 are connected near the edges of the shell member 33. A plurality of elastic bands 37 are each connected to the front guard 33 by means of at least one pair of fastening devices 38 near the center of the band 37, and replaces the corresponding elastic band 17 of FIGS. 1 and 2. Each band 37 is provided with a female fastening member 29 near each end so that the shell member 33 is firmly held in contact with the front portion of the leg 18 as each female fastening member 29 detachably engages a corresponding male fastening member 31 of the protective device 10.

Referring now to FIGS. 6–9, the protective device 10 may be made, in accordance with principles of the present invention, by a series of steps as illustrated. As shown in FIG. 6, the plastic member 11 of FIGS. 1 and 2 is formed by a conventional vacuum-forming process. A limp, heated sheet of a thermoplastic, such as acunitrol butadiene styrene, 41 is placed over the opening of a female forming or mold member 42. Thereupon, the heated thermoplastic 41 tends to deform under the force of gravity and enter a chamber 43 formed by the walls of the female forming member 42. A plug assist member 44, which is generally T-shaped in cross-section, is downwardly inserted into the approximate center of the sheet of plastic 41, and thus forces the heated plastic 41 to deform to a greater extent whereby a greater amount of the plastic 41 enters the chamber 43. The plug assist member 44 continues to move downwardly into the chamber 43 until an upper end portion 46 of the plug assist member 44 contacts the upper surface of the female forming member 42 with a portion of the plastic 41 squeezed therebetween.

After clamping the plug assist member 44 to the forming member 42 to seal the chamber 43 by means of the upper end portion 46 of the plug assist, the chamber 43 is thence evacuated. A vacuum chamber 47 at the lower portion of the female forming member 42 is connected to a vacuum pump for evacuation of the cavity in the member 42 through a plurality of passageways 48. As shown, the passageways 48 communicate between the vacuum chamber 47 and the chamber 43 to cause the chamber 43 to become evacuated in response to the evacation of vacuum chamber 47.

The evacuation of the chamber 43 causes the heated deformable plastic 41 to be drawn into close conformity with the inner surface of the chamber 43 to thereby assume the final shape of the outer surface of the plastic member 11 of FIGS. 1 and 2. The inner surface of the chamber 43 has a series of grooved or recessed portions 49 which enable the plastic 41 to conform thereto to provide the stiffening ribs 12 of FIGS. 1 and 2.

Referring now to FIG. 7, after the plastic 41 cools and assumes its final molded shape, plastic foam forming mixture 51 is poured into the chamber 43 of the female forming member 42. The mixture 51 is preferably liquid polyurethane foam which is a two-part material which expands upon mixing thereof, whereby one part of the foam 51 is first poured into the chamber 43, and thereafter the second part of the foam 51 is poured from a container 52 into the chamber 43, thereby forming a mixture which expands into a foam-like substance.

Referring now to FIG. 8, a position mold or foaming fixture 53 has a cross-sectional shape which conforms to the cross-sectional shape of the inner surface of the protective device 10. A thermoplastic or polyethylene film 54 covers the outer surface of the foaming fixture 53 and may be drawn into conformity with the fixture 53 by a vacuum forming process as described above regarding the shell.

The film-coated foaming fixture 54 is thence inserted downwardly into the chamber 43 of the female forming member 42 to cause the polyurethane foam 51 to be partially displaced by the foaming fixture 54 and thereby move upwardly into conformity with the inner surface of the formed plastic 41. The polyethylene foam 51 conforms and adheres to the film 41, which acts as a parting agent upon removal of the foaming fixture 54 from the chamber 43.

Referring now to FIG. 9, the foaming fixture 53 is illustrated in its lowermost position, contacting the female forming member 42 at the top portion thereof. In this final position, the polyurethane foam 51 is caused to conform and adhere to the inner surface of the female forming member 42 and also to the outer surface of the film-lined fixture 53. The polyurethane foam 51 therefore conforms to a pair of recessed areas 56 in the outer surface of the film-lined fixture 53 to provide the built-up areas 24 of the resilient backing member 16 of FIG. 2.

After the polyurethane foam hardens into its final state, the foaming fixture 53 is withdrawn from the female forming member 42. In addition to serving as a parting agent during the molding operation, the film 54 provides a smooth imperforate inner surface for the guard which is easily cleaned and prevents the foam material from tending to absorb perspiration. Thereafter, the protective device 10 can be removed from the female forming member 42.

The rows of apertures shown in FIG. 1 are then placed in the plastic 41, the polyurethane foam 51 and the thermoplastic film 54 by a suitable punching process or the like. Also, the fastening device 21 may then be inserted according to the mounting arrangement as shown in FIG. 3.

While the present invention has been described in connection with certain embodiments thereof, it will be understood that those skilled in the art may make many changes and modifications without departing from the true spirit and scope of the invention. Therefore, it is intended by the claims which are appended hereto and which form a part of the present specification to cover all such changes and modifications which fall within the true spirit and scope of the present invention.

I claim:

1. A protective device for the leg of a horse comprising:

an elongated substantially U-shaped member formed of plastic having a plurality of parallel spaced-apart longitudinally extending laterally disposed ribs integrally formed thereon for absorbing and uniformly distributing external impacts, and having upper and lower outwardly extending flange portions oppositely disposed and integrally connected at each end of said U-shaped member;

resilient backing means secured to the inner surface of said U-shaped member to form a compressible inner lining for said U-shaped member, the lined U-shaped member having a plurality of apertures extending through both the plastic member and said resilient backing means for ventilation purposes; and attaching means connected to said U-shaped member for detachably holding said U-shaped member to the sides and rear portions of the leg of a horse, said backing means conforming to the contour of said leg, said upper flange portion embracing the back portion of the knee of said leg and said lower flange portion embracing the rear portion of said leg at the fetlock.

2. The protective device according to claim 1, further including an elongated curved front member formed of plastic having a rib integrally formed thereon for absorbing and uniformly distributing external impacts;

second resilient backing means secured to the inner curved surface of said front member; and means secured to said front member for connecting said front member to said U-shaped member so that said front member is held in close contact with the front side of said leg.

3. The protective device according to claim 1, wherein one of said ribs is disposed at the rear portion of said U-shaped member, and a second and third rib are oppositely disposed at each side portion of said U-shaped member; and said resilient backing means comprises a resilient and flexible foam-like member having the inner surface thereof secured and conforming to the inner surface of said molded member, and a soft pliable film secured and conforming to said outer surface of the backing member, said foam member having a relatively larger cross-sectional area at the sides of said U-shaped member opposite to each of said second and third ribs to cause said backing means to contact the surface of each side of said leg between the tendon and the cannon bone of said leg and having a relatively larger cross-sectional area at the rear portion of said molded member.

4. The protective device according to claim 3, wherein said U-shaped member is composed of acunitrol butadiene styrene, said resilient backing means is composed of polyurethane, and said pliable film is composed of polyethylene.

5. The protective device according to claim 3, wherein said attaching means comprises a resilient elastic band detachably connected to said U-shaped member to securely hold said U-shaped member in close contact with said leg for enabling said U-shaped member to resiliently move upward in response to external upwardly-directed forces acting upon said lower flange portion.

(References on following page)

References Cited

UNITED STATES PATENTS

| | | | |
|---|---|---|---|
| 518,044 | 4/1894 | McGuire | 54—82 |
| 766,425 | 8/1904 | Coleman | 119—126 |
| 837,719 | 12/1906 | Piccone | 54—82 |
| 1,945,226 | 1/1934 | Lutsche | 54—82 |
| 2,194,921 | 3/1940 | Wagner | 54—82 |
| 2,937,487 | 5/1960 | Dever | 54—82 |
| 3,209,517 | 10/1965 | Hyman | 54—82 |
| 3,256,880 | 6/1966 | Caypinar | 128—88 |

ALDRICH F. MEDBERY, *Primary Examiner.*